United States Patent [19]

Pontius et al.

[11] Patent Number: 4,883,645

[45] Date of Patent: Nov. 28, 1989

[54] DEVICE FOR PREPARING AND EJECTING A CHEMICALLY REACTING MIXTURE

[75] Inventors: Klaus Pontius, Hermeskeil; Manfred Settinger, Ockten, both of Fed. Rep. of Germany

[73] Assignee: Klöckner Ferromatik Desma GmbH, Malterdingen, Fed. Rep. of Germany

[21] Appl. No.: 87,786

[22] Filed: Aug. 21, 1987

[30] Foreign Application Priority Data

Aug. 27, 1986 [DE] Fed. Rep. of Germany ....... 3629042

[51] Int. Cl.$^4$ .......................... C08J 9/00; B29C 45/02; B01F 5/04; B01F 15/02
[52] U.S. Cl. ................................. 422/133; 264/328.6; 425/543; 366/173; 366/196
[58] Field of Search ................... 422/132, 133; 366/78, 366/137, 138, 150, 154, 155, 159, 173, 167; 74/828, 838, 55

[56] References Cited

U.S. PATENT DOCUMENTS

| | | | |
|---|---|---|---|
| 3,908,968 | 9/1975 | Bielfeldt et al. | 366/78 |
| 3,921,963 | 11/1975 | Neff et al. | 366/78 |
| 4,721,602 | 1/1988 | Woitzel | 422/133 |

FOREIGN PATENT DOCUMENTS 2065841 11/1977 Fed. Rep. of Germany .

*Primary Examiner*—Barry S. Richman
*Assistant Examiner*—William H. Beisner
*Attorney, Agent, or Firm*—Watson, Cole, Grindle & Watson

[57] ABSTRACT

A device for preparing a chemically reacting mixture and for ejecting the mixture into a mold, the mixture comprising at least two components, in particular a mixture of isocyanate and a polyol that reacts completely to form polyurethane, the device having a mixing head with an outwardly opening bore, and a reciprocable ram coupled to the head. The ram has an ejector rod axially movable in the bore for therewith defining a mixing chamber and for ejecting the mixture from the chamber. The head has inlet passages for inletting the components into the chamber for preparing the mixture. The ram is coupled to a rotational drive for rotating the rod about its longitudinal axis continuously during the preparation of the mixture to avoid any adherence of the mixture to the rod and/or to the wall of the bore. Alternatively, the rod may be oscillated about its longitudinal axis, or along its longitudinal axis.

3 Claims, 2 Drawing Sheets

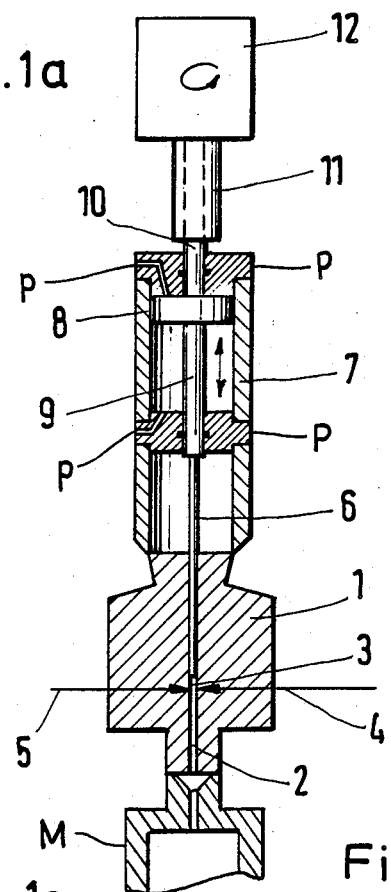
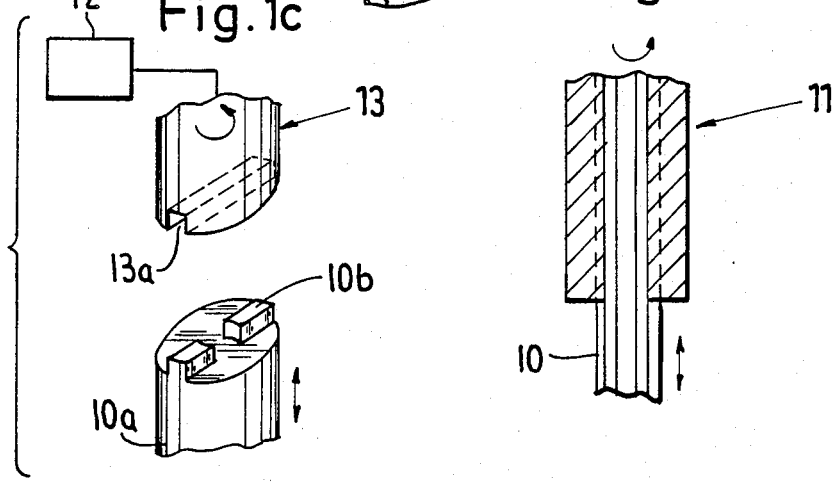

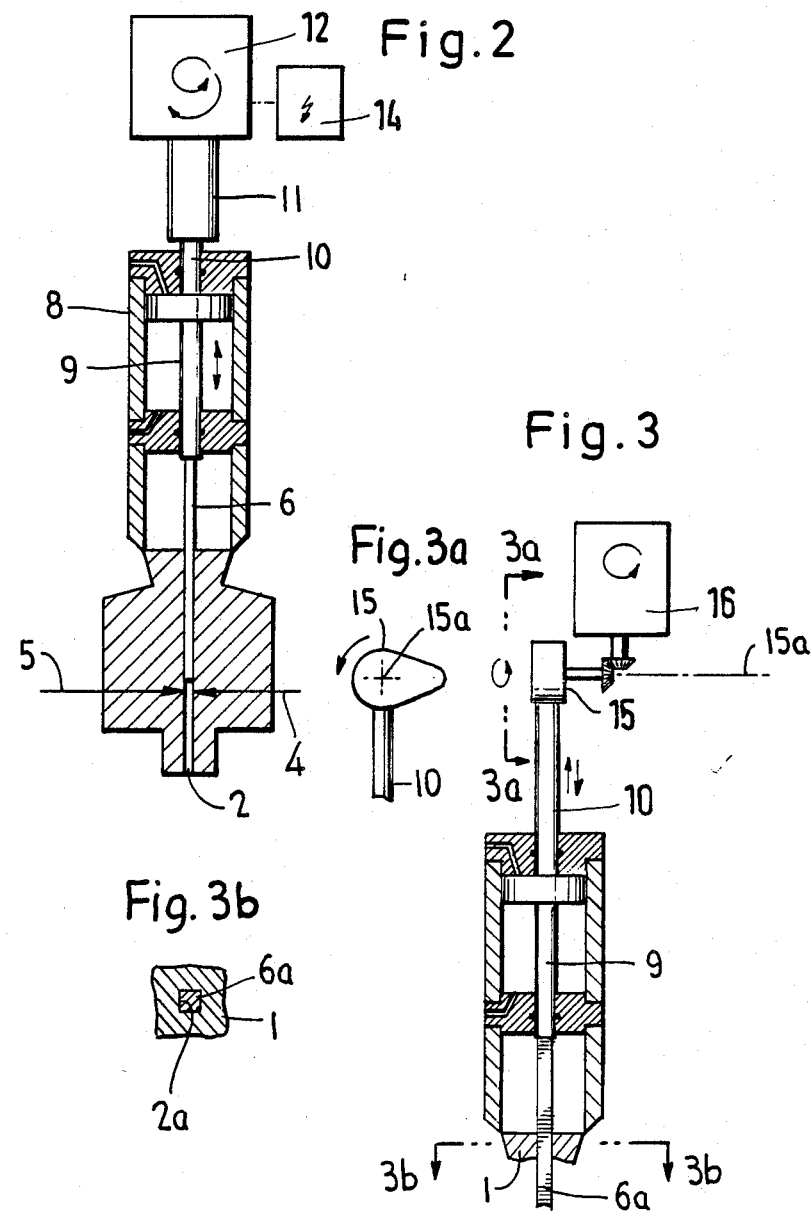

DEVICE FOR PREPARING AND EJECTING A CHEMICALLY REACTING MIXTURE

RELATED APPLICATION

This application relates to U.S. Ser. No. 087,821, filed Aug. 27, 1986, commonly owned herewith.

BACKGROUND OF THE INVENTION

This invention relates to a device for preparing a chemically reacting mixture and for ejecting the mixture into a mold cavity, the mixture comprising at least two components, in particular a mixture of isocyanate and a polyol that reacts completely to form polyurethane. The device comprises a mixing head having an outwardly open bore, and a reciprocable ram coupled to the head, the ram having an ejector rod axially movable in the bore for therewith defining a mixing chamber and for ejecting the mixture from the chamber.

West German Patent No. 2065841 discloses a device of this general type for preparing molded bodies of polyurethane. The mixing head of this device has a bore with an open face which forms the exit opening for the mixture, and to which the cavity of a mold is connected to prepare a molded body of polyurethane. Opposed infeed nozzles are located between opposite ends of the bore in the mixing head for respectively injecting isocyanate and a polyol into the bore. Mixing results from the impact of one chemical on the other. The bore defines a mixing chamber together with an axially movable rod of a reciprocable ram. The rod moves axially in the bore for ejecting the mixture from the chamber. The ram is known as a cleaning ram, and while the components are being mixed in the chamber, the ejector rod of the ram is located above the opposing inlet nozzles.

The reaction which forms polyurethane has a very high adhesion strength such that the residues of the mixture tend to cling to the rod of the cleaning ram. Thus, extremely high hydraulic pressures are required to axially shift the rod during operation of the device. As a result, the rod of the cleaning ram tends to frequently break during repeated and frequent use.

SUMMARY OF THE INVENTION

An object of the invention is to provide a device of the type generally characterized above which avoids the formation of adhesive forces acting on the rod of the cleaning ram during operation of the device.

In carrying out this objective, the device according to the invention has its cleaning ram coupled to a rotational drive for rotating the rod about its longitudinal axis continuously at least while preparing the mixture upon injecting the two components into the chamber, and, in accordance with one embodiment, while ejecting the mixture from the chamber. By such rotation, any adherence of the mixture residue or film to the rod and/or to the wall of the bore is substantially avoided.

In accordance with another embodiment to the invention, the cleaning ram is coupled to a drive for oscillating the rod about its longitudinal axis continuously during preparation of the mixture and while ejecting the mixture out of the chamber to likewise avoid any adherence of the mixture residue or film to the rod and/or the wall of the bore.

In accordance with a further embodiment, the cleaning ram is coupled to a drive for oscillating the rod along its longitudinal axis continuously during at least the preparation of the mixture so as to avoid any adherence of the mixture to the rod and/or to the wall of the bore.

Other objects, advantages and other features of the invention will become more apparent from the following detailed description of the invention when taken in conjunction with the accompanying drawings.

BRIEF DESCRIPTIONS OF THE DRAWINGS

FIG. 1a is a schematic illustration of one embodiment of the invention showing the device in vertical cross-section together with a partial showing of a mold;

FIG. 1b is an enlarged vertical sectional view of the coupling of FIG. 1a between the ram and the rotating drive;

FIG. 1c is an enlarged, expanded, perspective view of an alternate coupling between the rotating drive and the ram;

FIG. 2 is a view similar to FIG. 1 of another embodiment of the invention;

FIG. 3 is a view similar to FIGS. 1 and 2 of yet another embodiment of the invention; and FIGS. 3a and 3b are views taken substantially along the lines 3a—3a and 3b—3b, respectively, of FIG. 3.

DETAILED DESCRIPTION OF THE INVENTION

Turning now to the drawings wherein like reference characters refer to like and corresponding parts throughout the several views, one embodiment of the device according to the invention is shown in FIG. 1a as comprising a mixing head 1 having an axial bore 2 opening outwardly of the head, the bore defining a mixing chamber 3 together with a rod 6 mounted for axial sliding movement within the bore. Opposing inlet passages or nozzles 4 and 5 (generally represented by arrows) are located in the mixing head for respectively inletting quantities of isocyanate and a polyol into the mixing chamber for preparing the chemically reacting mixture therein as these two components impact on one another, to form a polyurethane as known in the art.

A reciprocable ram is coupled to the mixing head in any known manner, the ram including the ejector or cleaning rod 6 axially movable in bore 2. A cylinder 7 of the ram houses a ram piston 8 which reciprocates therein in the direction of the double arrow, between opposing cylinder plates P. The ram piston is reciprocated in the normal manner by inletting and expelling pressurized hydraulic fluid or pressurized air, from a suitable source (not shown), to opposite sides of the piston through hydraulic or neumatic flow passages p located in plates P.

The piston has a piston rod 9 slidable through lower plate P and coupled to rod 6. And, the piston has a rod 10 slidable through upper plate P and coupled to a gear coupling sleeve 11. As more clearly shown in FIG. 1b, rod 10 has an axial external ribs engaged with inner axial ribs of coupling 11 to facilitate relative axial movement of rod 10 while permitting rotation of the rod together with coupling 11 in the direction of the curved arrow shown, or in the opposite direction. Rotational drive means, generally designated 12, is coupled to sleeve 11 for clockwise or counterclockwise rotation of the sleeve and the ram coupled thereto.

After the two components, isocyanate and a polyol, are fed into the mixing chamber through nozzles 4 and 5 for preparing a chemically reacting mixture to form polyurethane, the ram is shifted pneumatically or hydraulically for axially extending rod 6 for ejecting the mixture out of bore 2 into the cavity of a mold M associated with the device as shown in FIG. 1a. While the two components are being fed into the mixing chamber to prepare the mixture, the ram and its rod 6 are continuously rotated either clockwise or counterclockwise by drive 12 via coupling 11 such that the residue or film of the reacted mixture which forms polyurethane will not adhere to rod 6 or to the wall of bore 2. Also, continuous rotation of rod 6 may be carried out while the ram is actuated for ejecting the mixture from the mixing chamber.

Rod 6 is of circular cross-section and bore 2 has a cross-section complementary thereto to permit relative rotation between rod 6 and mixing head 1.

In FIG. 1c, a lockable coupling 13 is driven by drive 12, and sleeve 11 is eliminated. This coupling has a transverse groove 13a on its underside, and rod 10a of the ram has one or more transverse mating ribs 10b on its upper side, as shown. Thus, with the piston in its uppermost position of FIG. 1a, rod 10a couples with coupling 13 and the cleaning ram is rotated by drive 12 continuously during preparation during the mixture.

The FIG. 2 device is the same as FIG. 1a except that a regulating device 14 of any known type is operatively connected with drive 12 to effect oscillation of the ram in opposite directions about the longitudinal axis of rod 6 during the mixing and ejection operations of the device.

The FIG. 3 embodiment is likewise the same as the device of FIG. 1a except that rod 10 in its uppermost position abuts against an eccentric cam disc 15 mounted for rotation about axis 15a, and further illustrated in FIG. 3a. A drive motor 16 is gear coupled to the cam for rotation about its axis to thereby oscillate the piston and its rod 6a along the longitudinal axis of the rod as shown by the oppositely directed arrows in FIG. 3. Rod 6a is of out-of-round cross-section, such as rectangular, shown in FIG. 3b, and bore 2a of mixing head 1 has a cross-section complementary thereto. Relative rotation of the rod about its longitudinal axis is thereby prevented. Rod 6a is oscillated in an axial direction continuously during the mixing process to avoid adherence of a film of the mixture to the rod and/or to the wall of the bore 2a.

The several embodiments of the invention as aforedescribed offer many distinct advantages. For example, the high hydraulic pressure normally required to extend the cleaning ram for ejecting the mixture is avoided. Thus, pneumatic pressure may be utilized for axial movement of the ram, which is more economical.

Moreover, rod 6 or 6a need not be so heavily designed as to accommodate such previously high hydraulic pressures, i.e., its diameter can be made significantly smaller than before. This has significant advantages with respect to the quality of the completely reacted mixture in that the distance between the tips of nozzles 4, 5 can be reduced which thereby improves the quality of the mixture.

Obviously, many other modifications and variations of the present invention are made possible in the light of the above teachings. It is therefore to be understood that within the scope of the appended claims the invention may be practiced otherwise than a specifically described.

What is claimed is:

1. A device for preparing a chemically reacting mixture, and for ejecting the mixture into a mold, the mixture comprising at least two components, in particular a mixture of isocyanate and a polyol that reacts completely to form polyurethane, the device comprising a mixing head having an outwardly open bore, a reciprocable ram coupled to said head, said ram having an ejector rod axially movable in said bore for therewith defining a mixing chamber and for ejecting the mixture from said chamber, said head having inlet passages for inletting the respective components into said chamber for preparing the mixture, means associated with said ram for axially moving said rod for ejecting the mixture out of said chamber, said rod having a circular cross-section and said bore having a cross-section complementary thereto, and drive means coupled to said ram for rotating said rod about its longitudinal axis continuously during the preparation of the mixture, whereby any adherence of the mixture to said rod and to the wall of said bore is substantially avoided.

2. A device for preparing a chemically reacting mixture, and for ejecting the mixture into a mold, the mixture comprising at least two components, in particular a mixture of isocyanate and a polyol that reacts completely to form polyurethane, the device comprising a mixing head having an outwardly open bore, a reciprocable ram coupled to said head, said ram having an ejector rod axially movable in said bore for therewith defining a mixing chamber and for ejecting the mixture from said chamber, said rod having a circular cross-section and said bore having a cross-section complementary thereto, and drive means coupled to said ram for oscillating said rod about its longitudinal axis continuously during the preparation of the mixture, whereby any adherence of the mixture to said rod and to the wall of said bore is substantially avoided.

3. A device for preparing a chemically reacting mixture, and for ejecting the mixture into a mold, the mixture comprising at least two components, in particular a mixture of isocyanate and a polyol that reacts completely to form polyurethane, the device comprising a mixing head having an outwardly open bore, a reciprocable ram coupled to said head, said ram having an ejector rod axially movable in said bore for solely defining a mixing chamber therewith, and for ejecting the mixture from said chamber, said rod having an out-of-round cross-section and said bore having a cross-section complementary thereto, and a drive means, independent of means for reciprocable movement of said rod, coupled to said ram for oscillating said rod along said longitudinal axis, during at least the preparation of the mixture, whereby any adherence of the mixture to said rod and to the wall of said bore is substantially avoided.

* * * * *